Aug. 22, 1967  W. R. PETERSON  3,337,270
DUAL WHEEL CONSTRUCTION FOR VEHICLES
Filed Oct. 11, 1965  2 Sheets-Sheet 1

Inventor:
Walter R. Peterson
By Snow and Benno
Attys

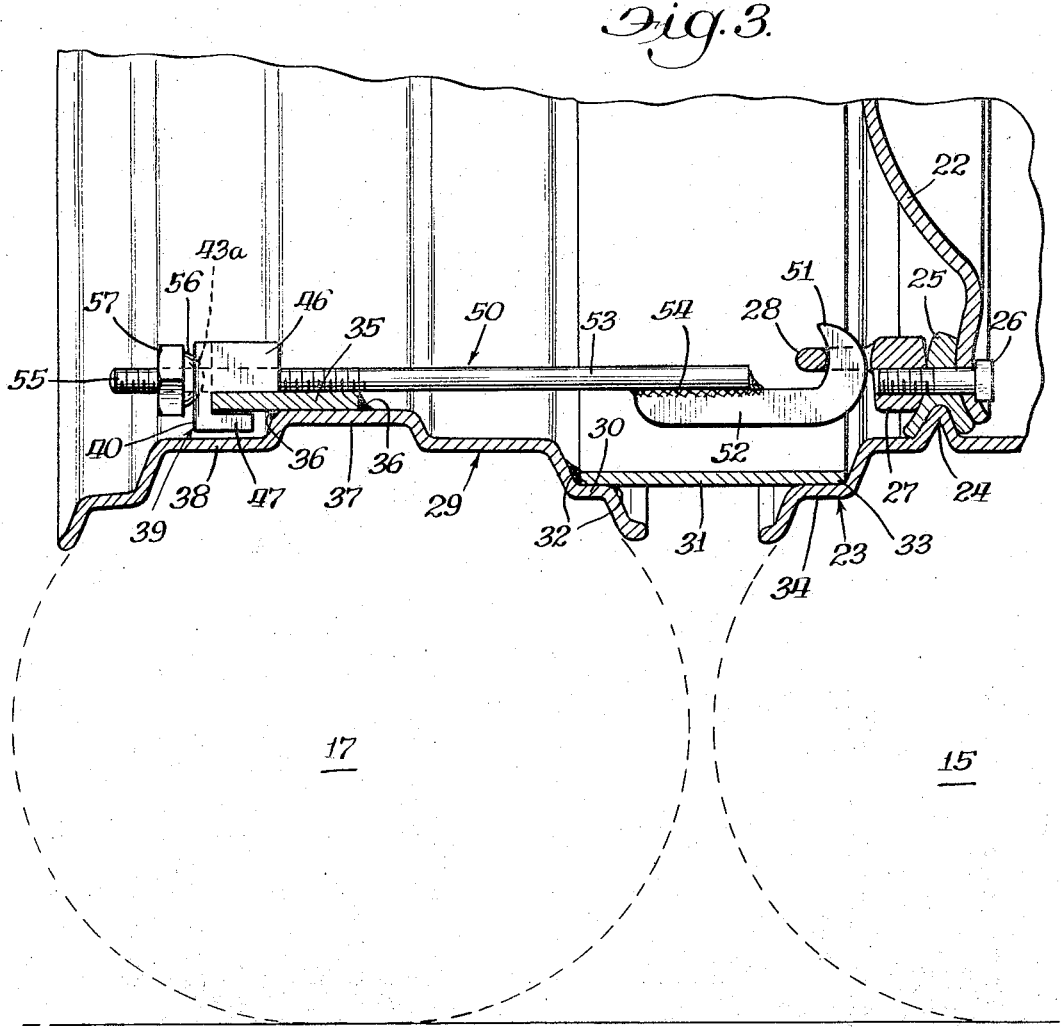
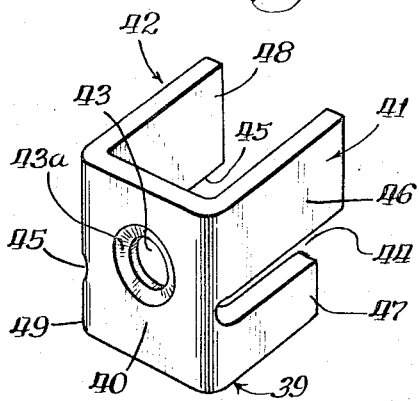
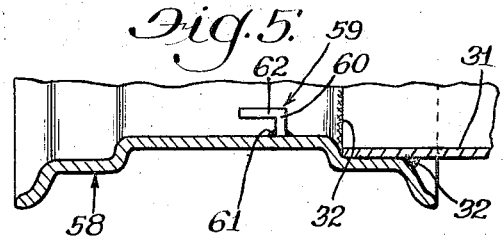

United States Patent Office 3,337,270
Patented Aug. 22, 1967

3,337,270
DUAL WHEEL CONSTRUCTION FOR VEHICLES
Walter R. Peterson, 213 Main St.,
Plainfield, Ill. 60544
Filed Oct. 11, 1965, Ser. No. 494,364
3 Claims. (Cl. 301—36)

ABSTRACT OF THE DISCLOSURE

The invention concerns the attachment of an auxiliary wheel to the regular traction wheel of a vehicle with provision for accommodating plural connecting means at any position around the circumference of the wheels.

This invention relates to a new and improved dual wheel construction for vehicles.

More particularly this invention is concerned with the means for attaching a second or auxiliary wheel to the existing wheel of a vehicle such as a tractor. It has long been recognized that a vehicle will have increased flotation and traction with greater ground engaging surfaces of its wheels. This is especially true of rubber tired vehicles and is accomplished either by enlarging the rubber tires used or adding wheels with additional tires. Of course, there are physical limitations on many vehicles which might prevent the use of either a larger tire or an additional wheel. However, it has been found that most tractors can have auxiliary wheels attached to the outsides of its regular wheels without interfering with the existing physical limitations of the tractor and yet provide untold additional flotation and traction for the tractor. Manufacturers of tractors and other vehicles do not follow rigid standards in the design of their wheels and thus it is a problem to make an auxiliary wheel which will be readily adaptable to all makes of tractors. The present invention is concerned with an auxiliary wheel construction that is readily adaptable for attachment to any make of tractor or vehicle wheel.

An important object of this invention is to provide an auxiliary wheel for vehicles that is readily adaptable for attachment to an existing vehicle wheel.

Another important object of this invention is the provision of novel attaching means on an auxiliary wheel which permits quick attachment of the auxiliary wheel to the regular wheel of a vehicle regardless of differences in construction of the regular vehicle.

Still another important object of this invention is to enable the use of auxiliary wheels on vehicles such as tractors to produce dual wheels giving the tractor exceptional flotation and traction.

Another and still further important object of this invention is to provide a novel means on a dual wheel to accommodate any spacing of attaching means that may be joined to the regular wheel to which the dual wheel is to be attached.

Another important object of this invention is to supply a novel annular member on the rim of an auxiliary wheel to support brackets which may be slidably adjusted thereon to align with the wheel holding lugs or the retainer means employed on the regular wheel on which the auxiliary wheel is mounted.

A further important object of this invention is to equip an annular rim of any cross sectional configuration with novel quick attaching means mounted thereon to enable its association with the regular wheel of a vehicle to produce a dual wheel for the vehicle.

Other and further important objects and advantages will become apparent from the disclosures in the following specification and accompanying drawings.

In the drawings:

FIGURE 3 is an enlarged partial transverse sectional detail taken through the dual wheels of FIGURE 2.

FIGURE 4 is a perspective view of the auxiliary wheel holding bracket utilized in attaching an auxiliary wheel to a regular vehicle wheel.

FIGURE 5 is a transverse sectional detail of a modified cross sectional shape of auxiliary wheel rim.

As shown in the drawings:

Figure 1:
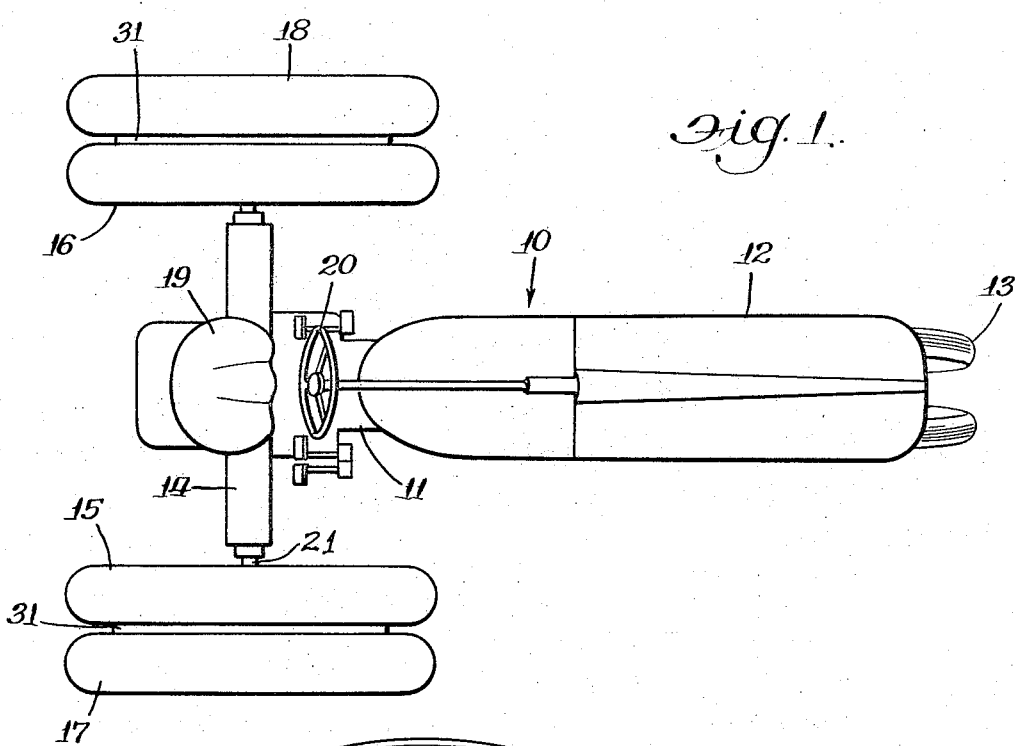
FIGURE 1 is a top plan view of an agricultural-type tractor embodying the dual wheels of this invention.

The reference numeral 10 indicates generally an agricultural-type tricycle tractor. This type of tractor has been used merely as being illustrative of the type of vehicles on which the auxiliary wheels of this invention may be used to greatly multiply the available flotation and traction. Obviously any type or style of tractor having ground engaging traction wheels could have the dual wheel construction of this invention mounted thereon. And, it is not to be construed as any limitation to the use of this dual wheel construction on tractors because it may equally be used to advantage on trucks or even passenger vehicles where improved flotation and traction is desired.

The tractor 10 is provided with an elongated chassis 11 carrying an engine 12 at the forward end thereof. Steerable wheels 13 are provided at the front of the chassis and support the front end thereof. The rear of the chassis 11 is provided with transversely disposed axle housings 14. At the outer ends of each of these housings there is carried a large rubber tired wheel as shown at 15 and 16 on opposite ends of the housings 14. An auxiliary rubber tired wheel 17 is joined to the regular tractor wheel 15 to give added flotation and traction characteristics to this tractor 10. Similarly, an auxiliary rubber tired wheel 18 is joined to the regular tractor wheel 16 to further enhance the flotation and traction of the tractor. The tractor is provided with an operator's seat 19 disposed between the pairs of traction wheels. A steering wheel 20 is provided forwardly of the operator's seat to permit the operator to control the steerable wheels 13. Other controls and operating mechanisms of the tractor are not described herein because they form no part of the present invention. The invention herein is concerned with the means for attaching auxiliary wheels to the regular wheels of a vehicle. Utilization of the dual wheels on a vehicle such as the agricultural tractor as shown is merely to indicate one embodiment of the invention in an operating device.

Figure 2:
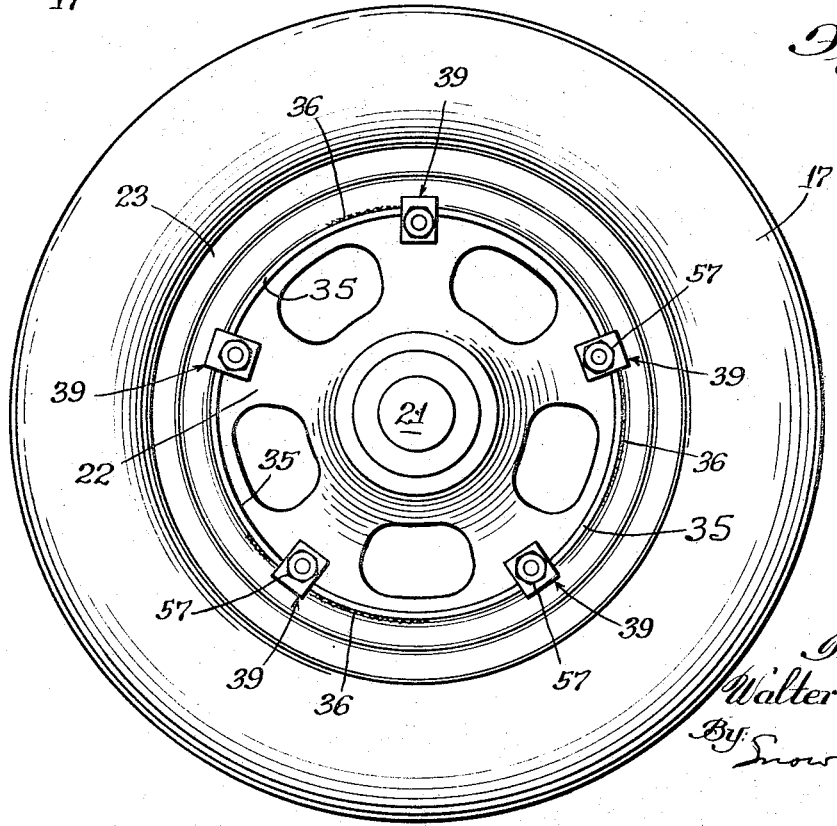
FIGURE 2 is an enlarged side elevational view of the dual wheels shown in FIGURE 1.

FIGURE 2 shows an enlarged side elevational view of the auxiliary wheel 17 attached to the regular tractor wheel 15. The regular tractor wheel 15 is mounted on an axle 21 journally supported within the axle housing 14. As best shown in FIGURES 2 and 3 the regular tractor wheel 15 is provided with a center support or spider 22 which carries at its outer periphery a rim 23. The rim 23 is provided with a radially inwardly projecting annular center bead 24 which is used as the basis for holding and centering the rim 23 on the wheel spider or disc 22. The interlocking means between the spider and rim is a Y-shaped bracket 25. The diverging arms of the Y straddle the radially inwardly projecting center bead 24 of the rim 23 while the center leg of the Y snugly abuts an outer annular portion of the wheel spider. Bolts 26 pass through aligned apertures in the spider 22 and the bracket 25 to enable the wheel spider and the bracket to be rigidly held together. Concurrently of course the rim 23 is held in fixed position relative to the spider by reason of the arrangement of the rim by the bracket 25. Suitable nuts are employed to cooperate with the bolts 26 to form the unitary assembly as shown in the drawing and just described. The number of rim holding lugs is variable with different tractor and vehicle manufacturers depending primarily upon the loads the vehicles are intended to carry. In the tractor as shown the number of wheel lugs is five but it should be clearly understood that any number of odd or even numbers of lugs may be employed on the regular tractor wheel and the auxiliary wheels of this invention will be readily adaptable for attachment to all wheels of the same diameter regardless of the number of lugs employed or the arcuate spacings of such lugs. It should be understood that the means used to receive the attaching means on the regular wheel of a vehicle need not be the lug bolts and nuts as shown in these drawings. It is apparent that bracket or hook means could be held by the wheel spider to act as arcuately spaced retainer means on the regular wheel in the same manner as the wheel lugs.

In the device depicted in FIGURE 3 of the drawings special cooperative nuts 27 are shown in engagement with the lug bolts 26. In this form of the invention as shown it is to these cooperative nuts that the auxiliary wheels 17 and 18 are attached and gain their support to the regular wheels 15 and 16 respectively. The cooperative nuts 27 have integrally formed eyelets 28 projecting axially from the outer end thereof. The eyelets 28 are utilized to hold the auxiliary wheels to the regular wheels.

The auxiliary wheel 17 is provided with a rim 29 substantially the same in cross sectional configuration as the rim 23 of the regular wheel 15. The rim 29 is provided with an annular shoulder 30 which carries on its inner annular surface spacer means 31. The spacer means 31 which is shown here as an annular band is weldably attached at one side edge thereof to the rim 29 at the position of the annular shoulder 30. The annular spacer band 31 has an outer free edge 33 which is adapted to nest in a comparable annular shoulder 34 of the regular rim 23. Thus when the auxiliary rim is drawn up tightly to the regular wheel the spacer means 31 provides the means for maintaining uniform spacing between the regular and auxiliary wheels. Although the spacer 31 has been stated to be an annular member, it should be understood that it may be comprised of several members at spaced apart intervals about the annular rim 29 of the auxiliary wheel 17 and still provide for uniform spacing relative to the regular wheel. The several intermittent spacer elements 31 would engage the shoulder 34 of the regular wheel rim 23 in the same manner as a continuous band. And, further it should be understood that the spacer means need not be welded or otherwise attached to either the auxiliary or regular wheels but may merely be nested between the rims as in offsets or shoulders and when the rims are drawn tightly together by the attaching means to be subsequently described the spacer would be fixedly held in position to properly space the wheels.

Means 35 shown in one preferred form as an annular band is weldably supported at 36 on a flat center portion 37 of the auxiliary wheel rim 29. The annular band 35 projects axially outwardly from the rim 29 in a direction opposite to the direction of the spacer member 31. The outward extension of the annular band 35 lies over and is spaced radially inwardly from an offset shoulder 38 of the wheel rim 29. The annular band 35 constitutes a track on which bracket means may be adjustably positioned for accommodating any number of spacings of wheel attaching means. For example the bracket means on the track could be spaced to align with each of the wheel lugs on the regular or existing vehicle wheel to which there is to be attached the auxiliary wheel of this invention. The auxiliary wheel 17 and also the auxiliary wheel 18 are each provided with members 31 and 35 which extend in opposite axial directions. The element 31 is the spacer means and the element 35 is the track means. It has already been explained that the spacer means 31 need not be continuous but rather may be intermittent and it should likewise be understood that the track member 35 need not be a continuously annular member. Also, in certain arrangements the track member need not be weldably fastened but may merely nest in and against annular shoulders in the rim to thus hold the track in operative position. The invention may also be practiced merely by having the member 35 extend for some arcuate distance to enable the adjustable placing of slidable brackets for the number and spacing accommodations of the regular wheel attaching means. A full annular track member 35 provides for an infinite number of bracket positionings whereas if the track means 35 is comprised of several arcuate members, then the bracket spacing would be limited to the extent of the several arcuate track means. However, it is the intention of applicant to encompass devices which have slidably adjustable bracket means throughout any range of movement and not necessarily a full annular movement.

The slidable brackets may be of various shapes and designs. One preferred form of the bracket is the U-shaped bracket 39 which is shown more specifically in FIGURE 4 of the drawings. The brackets are provided with a base portion 40 and parallel spaced apart sides 41 and 42 projecting outwardly from the base 40. The base 40 is provided with a hole 43 having its axis disposed generally parallel with the side walls 41 and 42 and substantially centrally therebetween. The hole 43 is provided with an annular bevelled recess 43a on the side thereof opposite the side walls 41 and 42. The side 41 is provided with a forwardly opening notch 44 which extend rearwardly substantially to the base wall member 40. The notch 44 lies generally parallel to the top and bottom of the side wall 41 and in a plane below the hole 43. A similar notch 45 in the side 42 is open at its forward end and extends rearwardly substantially to the base wall 40 of the U-shaped bracket 39. The notch 44 divides the side wall 41 into an upper part 46 and a lower somewhat shorter part 47. Similarly, the notch 45 divides the side wall 42 into an upper part 48 and a comparably shorter lower part 49. The forwardly opening notches 44 and 45 are in planar alignment and are adapted to engage the outwardly extending free edge of the annular track or band 35. The upper parts 46 and 48 of the side walls 41 and 42 slide on the top surface of the annular band and the lower parts 47 and 49 slide on the under surface of the annular band. The lower parts 47 and 49 are disposed at a position slightly radially inwardly of the annular offset shoulder 38 of the auxiliary rim 29. The brackets may thus be slidably positioned as necessary for alignment with the wheel attaching means of the regular vehicle wheel 15.

The means for interconnecting the eyelets 28 of the nut members 27 or other attaching means on the regular wheel and the adjustable brackets 39 on the auxiliary wheel are preferably a bolt which may take various forms. In a preferred embodiment this interconnecting member is a J bolt 50. The J bolt construction is shown more particularly in FIGURE 3. The bolt is provided at its inner end thereof with a hook 51 which is used to engage the attaching means on the regular wheel. The hook has an offset shank 52. The other end of the J bolt assembly comprises a bolt 53. The bolt 53 is weldably attached at 54 to the offset shank 52. The outer end of the bolt 53 is threaded at 55 and is adapted to pass axially and loosely through the hole 43 in the bracket 39. A washer 56 having a semi-spherically shaped inner surface is adapted to nest for rockable movement in the annular bevelled recess 43a of the bracket hole 43. A nut 57 engages the threaded end 55 of the J bolt 50 and as the nut is drawn up tightly the washer 56 seats against the bevelled recess 43a and concurrently draws the adjustable bracket 39 against the outer extension of the track 35 thereby pulling the auxiliary wheel against the regular wheel but limited in its extent by the spacer member 31. In the assembly as shown the hook 51 engages the nut eyelet 28. The bolt portion 53 is in substantial axial alignment with the lug bolt 26 of the regular wheel so that there is a general uniform in-line drawing up of the auxiliary wheel to the regular wheel.

FIGURE 5 of the drawings shows a modification of the invention wherein the bracket receiving track is mounted on an auxiliary rim 58 having a cross sectional configuration different from that shown in FIGURE 3. Means 59 in the form of an annular member is comparable in function to band 35 of FIGURE 3. The member 59 is angular in cross section and has a generally radially extending arm portion 60 which is weldably attached at 61 to the rim 58. The member 59 also has a generally axially extending arm 62 which is adapted to receive the slidable brackets 39 in the same manner as the track 35.

*Operation of the device*

The invention described herein is concerned with the mounting of an auxiliary wheel in association with the regular wheel of a vehicle for the purpose of substantially increasing the ground engaging flotation and traction of the vehicle. An auxiliary wheel having either a rim such as shown at 29 in FIGURE 3 or such as shown at 58 in FIGURE 5 is placed adjacent the wheel to which it is desired to add the available flotation and traction from an auxiliary wheel. The spacer means 31 which is welded as shown at 32 to either rim has its inner free end abutting an offset in the regular tractor wheel rim 23 such as shown in FIGURE 3. If the lugs are to be used as the attaching means the regular lug nuts of the regular tractor wheels either 15 or 16 are removed and replaced with the special nuts 27 which have integral eyelets formed therewith. The J bolts 50 are hooked into the eyelets 28 and a bracket 39 is placed over the track 35 or 62 and nuts 57 threaded onto the end of the outwardly extending bolt portions 53. Because of the arcuate extent of the track members 35 and 59 the brackets can be readily arcuately moved to a position of alignment with the existing attaching means of the regular vehicle wheels. This is true regardless of the number and spacing of the attaching means used. Further compensation for irregularities in the assembly are obviated by reason of the semi-spherical surfaced washer 56 engaging the bevelled recess 43a of the bracket bolt hole 43. In the device illustrated in the drawings there are five J bolts and five U-shaped slidable brackets 39. In each instance the nuts 57 are drawn up tightly to securely and firmly hold the auxiliary rim clamped to the regular wheel of the vehicle. This construction assures that the auxiliary wheels 17 and 18 will assume a substantial portion of the load of the vehicle and give greatly increased flotation and ground engaging traction to the vehicle. Prior constructions have almost invariably had fixed spaced apart bracket means on the auxiliary rim to thereupon limit the use of a particular auxiliary rim to a tractor wheel of corresponding lug spacings. Now a single auxiliary rim of any fixed diameter is adaptable for use with any tractor wheel of the same diameter regardless of the lug spacings by reason of the adjustability of the attaching brackets 39 on the annular or extended tracks 35 or 59.

Numerous details of construction may be varied throughout a wide range without departing from the principles disclosed herein and I therefore do not propose limiting the patent granted hereon otherwise than as necessitated by the appended claims.

What is claimed is:

1. An auxiliary wheel for attachment to and rotation with the regular wheel of a vehicle in which the regular wheel is of the type having a wheel spider, a wheel rim, and arcuately spaced apart wheel lugs joining the wheel spider to the wheel rim, said auxiliary wheel comprising a wheel rim, spacer means fixedly attached to said auxiliary wheel rim and adapted to abut the wheel rim of the regular wheel when the wheel rims are placed in side-by-side relationship, arcuate track means fixedly attached to said auxiliary wheel rim, said arcuate track means including a free edge extending outwardly from the rim of the auxiliary wheel and away from the regular wheel and lying generally parallel with the axis of rotation of the wheels, U-shaped attaching brackets slidably mounted on said outwardly extending free edge of the arcuate track means, eyelet means on said regular wheel lugs and hook means joining said eyelet means on said regular wheel lugs and unitary bolt means on said hook means, said U-shaped brackets having a base with a hole therethrough, said attaching brackets receiving said unitary bolt means through the base hole, the spaced arms of said U-shaped bracket flanking said unitary bolt means, and nut means threadedly engaging said bolt means and abutting the hole in the base of the U-shaped brackets to hold said wheel and auxiliary wheel in locked relationship.

2. An auxiliary wheel for attachment to and rotation with the regular wheel of a vehicle in which the regular wheel is of the type having a wheel spider, a wheel rim, and arcuately spaced apart wheel lugs joining the wheel spider to the wheel rim, said auxiliary wheel comprising a wheel rim, spacer means fixedly attached to said auxiliary wheel rim and adapted to abut the wheel rim of the regular wheel when the wheel rims are placed in side-by-side relationship, arcuate track means fixedly attached to said auxiliary wheel rim, said arcuate track means including a free edge extending outwardly from the rim of the auxiliary wheel and away from the regular wheel and lying generally with the axis of rotation of the wheels, U-shaped attaching brackets having their spaced arms slotted inwardly from their outer ends and slidably mounted by their slots on said outwardly extending free edge of the arcuate track means, eyelet means on said regular wheel lugs and hook means joining said eyelet means on said regular wheel lugs and unitary bolt means on said hook means, said slotted U-shaped brackets having a base with a hole therethrough offset from said slot, said attaching brackets receiving said unitary bolt means through the base hole, the spaced arms of said U-shaped bracket divided by said slot into a first set of arms flanking said unitary bolt means on one side of said outwardly extending free edge of said arcuate track means and a second set of arms on the other side of said outwardly extending free edge of said arcuate track means, and nut means for threadedly engaging said bolt means and abutting the hole in the base of the slotted U-shaped brackets to hold said wheel and auxiliary wheel in locked relationship.

3. An auxiliary wheel for attachment to and rotation with the regular wheel of a vehicle in which the regular wheel is of the type having a wheel spider, a wheel rim, and arcuately spaced apart wheel lugs joining the wheel spider to the wheel rim, said auxiliary wheel comprising a wheel rim, spacer means fixedly attached to said auxiliary wheel rim and adapted to abut the wheel rim of the regular wheel when the wheel rims are placed in side-by-side relationship, arcuate track means fixedly attached to said auxiliary wheel rim, said arcuate track means including a free edge extending outwardly from the rim of the auxiliary wheel and away from the regular wheel and lying generally parallel with the axis of rotation of the wheels, transversely slotted U-shaped attaching brackets slidably mounted by their transverse slots on said outwardly extending free edge of the arcuate track means, eyelet means on said regular wheel lugs and hook means joining said eyelet means on said regular wheel lugs and unitary bolt means on said hook means, said slotted U-shaped brackets having a base with an outwardly chamfered hole therethrough at a location spaced from the transverse slot, said attaching brackets adapted to receive said unitary bolt means through the outwardly chamfered hole, the spaced arms of said U-shaped bracket divided by said transverse slot into a first set of arms flanking said unitary bolt means on one side of said outwardly extending free edge of said arcuate track means and a second set of arms on the other side of said outwardly extending free edge of said arcuate track means, and nut means with one side thereof having a semi-spherical surface, said nut means threadedly engaging said bolt means and said semi-spherical surface abutting the chamfered hole in the base of the transversely slotted U-shaped brackets and cooperating therewith to hold said wheel and auxiliary wheel in locked and aligned relationship.

References Cited

UNITED STATES PATENTS

| | | | |
|---|---|---|---|
| 1,327,607 | 1/1920 | Baker | 301—38 X |
| 1,580,385 | 4/1926 | Schroeder. | |
| 2,677,503 | 4/1954 | Bodkin | 24—263 X |
| 3,082,040 | 3/1963 | Degerness | 301—36 |
| 3,237,992 | 3/1966 | Kiesau | 301—36 |

FOREIGN PATENTS

| | | |
|---|---|---|
| 448,052 | 11/1912 | France. |
| 15,179 | 1909 | Great Britain. |

BENJAMIN HERSH, *Primary Examiner.*

RICHARD J. JOHNSON, *Examiner.*